United States Patent [19]
Gerber et al.

[11] Patent Number: 6,111,432
[45] Date of Patent: Aug. 29, 2000

[54] SYMMETRIC ADAPTER UNIT FOR SWITCHING A LOGIC SIGNAL

[75] Inventors: Remi Gerber, Nantes; Viry Chea Chan, St. Herblain, both of France

[73] Assignee: MHS, Nantes, France

[21] Appl. No.: 09/131,741

[22] Filed: Aug. 10, 1998

[30] Foreign Application Priority Data

Nov. 8, 1997 [FR] France ................................. 97 10256

[51] Int. Cl.[7] .............................................. H03K 19/0175
[52] U.S. Cl. .................................. 326/83; 326/97; 326/57
[58] Field of Search ................................. 326/56, 57, 58, 326/82, 83, 86, 112, 119, 121, 21, 26, 27

[56] References Cited

U.S. PATENT DOCUMENTS

| | | | |
|---|---|---|---|
| 4,961,010 | 10/1990 | Davis | 307/443 |
| 5,041,741 | 8/1991 | Steele | 307/443 |
| 5,341,039 | 8/1994 | Fukumoto . | |
| 5,504,782 | 4/1996 | Campbell, Jr. . | |
| 5,633,600 | 5/1997 | Ohmishi | 326/17 |
| 5,694,065 | 12/1997 | Hamasaki et al. | 327/108 |

FOREIGN PATENT DOCUMENTS 0 632 392 A1  1/1995  European Pat. Off. .
WO 84/02620  7/1984  WIPO .

OTHER PUBLICATIONS

T.J. Gabara et al., "High Speed, Low Power CMOS Transmitter–Receiver System," *Proceedings 1988 IEEE International Conference on Computer Design*, pp. 344–347, (1988).

*Primary Examiner*—Michael Tokar
*Assistant Examiner*—Anh Tran
*Attorney, Agent, or Firm*—Christensen O'Connor Johnson & Kindness PLLC

[57] ABSTRACT

A symmetric adapter unit for switching a logic signal implemented in CMOS technology that includes a control module for transmission and non-transmission of the logic signal, receiving this logic signal and a control logic signal to deliver a first and a second asymmetric switching control signal. A bistable type switching module receives the first and the second switching control signal and delivers a logic signal adapted in phase with the logic signal or a substantially constant signal to the output terminal, constituting a high impedance output.

3 Claims, 10 Drawing Sheets

SYMMETRIC ADAPTER UNIT FOR SWITCHING A LOGIC SIGNAL

FIELD OF THE INVENTION

The invention concerns a symmetric adapter unit for switching a logic signal.

Current computer systems enable increasingly substantial amounts of data to be processed.

While, qualitatively, this data is binary coded, the corresponding processes basically requiring, at a first level of processing, logical functions, then, at a second level of processing, semantic, lexical or numerical functions, all these various functions, which are complex, can only be implemented from logic signals the analog tolerances of which, as voltage values, for rise time and/or fall time currents at switching, are calibrated and maintained within well defined acceptable tolerance ranges.

This is especially true as regards the transmission of these signals, or at least their routing, between the different stages of integrated circuits or between different integrated circuits, ensuring, for example, the aforementioned second level functions in a given computer system.

OBJECTS OF THE INVENTION

The object of the present invention is the implementation of a symmetric adapter unit for switching a logic signal which in particular enables this type of signal to be transmitted while bringing about a reduction in the reflections caused, during this transmission, by the inability of standard circuits to handle the characteristic impedance of the transmission line used.

A further object of the present invention is the implementation of a symmetric switching adapter unit which ensures a switching adaptation of logic signals transmitted, both static and dynamic, from the transitions constituting these switching operations.

A further object of the present invention is also the implementation of a symmetric switching adapter unit which additionally enables waveform symmetry to be retained in relation to the high logic level/low logic level switching direction or vice versa.

A further object of the present invention is also the implementation of a symmetric switching adapter unit which is usable for short transmission lines, of a few centimetres, or long ones, of a few metres.

SUMMARY OF THE INVENTION

The symmetric adapter unit for switching a logic signal, which is the object of the present invention, the switching of this logic signal occurring between a high logic level and a low logic level, or vice versa, delivers a logic signal adapted in phase with this logic signal and a substantially constant signal to a high impedance output terminal. It is noteworthy in that it comprises at least, connected in cascade, a control module for transmission or non-transmission by this adapter unit, this control module receiving at a first input terminal this logic signal and at a second input terminal a control logic signal and delivering a first and second asymmetric switching control signal. The first switching control signal from high logic level to low logic level, or vice versa, presents a fall time, and a rise time respectively, greater than that of the second switching control signal. To this control module is further connected a bistable type switching module receiving the first and second switching control signal and delivering to an output terminal, constituting the output terminal of the symmetric adapter unit, either the logic signal adapted in phase with the logic signal for a first logical value of the control logic signal, or, for an additional value of this first logical value of the control signal, the said substantially constant signal to the high impedance output terminal.

The symmetric adapter unit for switching a logic signal, the object of the present invention, finds application in the integrated circuits industry, particularly in CMOS technology.

BRIEF DESCRIPTION OF THE DRAWINGS

It will be better understood from reading the description and from examining the drawings below in which.

DETAILED DESCRIPTION OF THE PREFERRED EMBODIMENTS

The symmetric adapter unit for switching a logic signal, the object of the present invention, will now be described linked to FIG. 1 and subsequent figures.

In general, it will be recalled that switching the logic signal transmitted by the symmetric switching adapter unit, the object of the present invention, occurs between a high logic level and a low logic level or vice versa, this unit thus delivering a logic signal adapted in phase with the original logic signal or, respectively, a more or less constant signal to a high impedance output terminal.

Thus, in a standard way, the symmetric adapter unit for switching a logic signal, the object of the present invention, delivers to its output terminal, either the logic signal adapted in phase with the original logic signal, or the substantially constant signal, the output terminal being then in a high impedance state, this unit thus presenting the characteristics of a three state unit.

Figure 1:
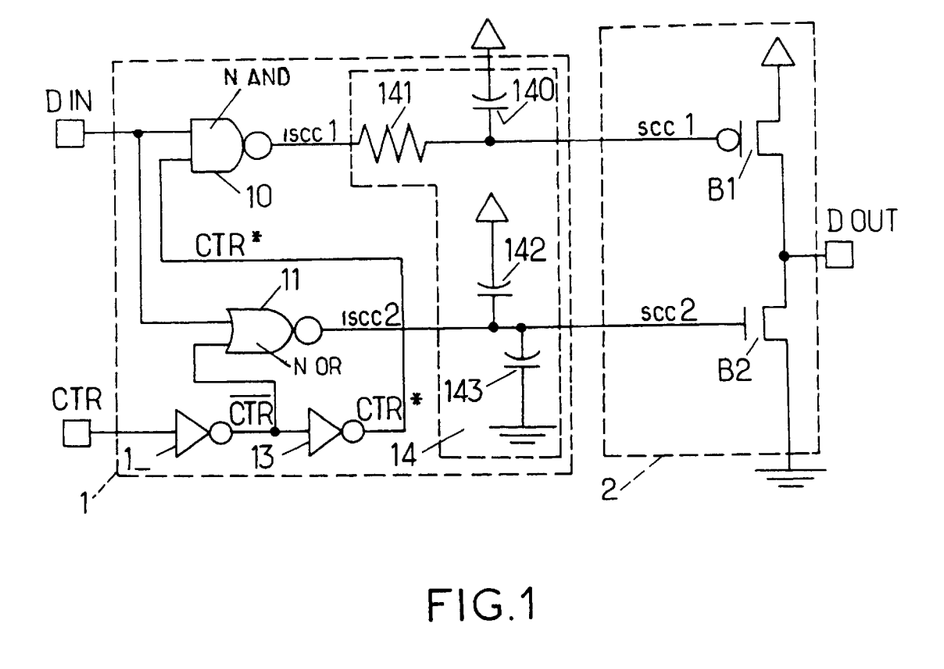
FIG. 1 shows a functional diagram of the symmetric adapter unit, the object of the present invention.

To this end, as shown in FIG. 1, the symmetric adapter unit for switching a logic signal, the object of the present invention, includes a control module 1 for transmission or non-transmission by the adapter unit of the original logic signal. This control module 1 receives at a first input terminal the original logic signal, denoted DIN, and at a second input terminal a control logic signal, denoted CTR. The transmission control module 1 delivers a first and second asymmetric switching control signal, denoted $scc_1$ for the first asymmetric switching signal and $scc_2$ for the second asymmetric switching signal.

In accordance with an especially noteworthy characteristic of the symmetric adapter unit for switching a logic signal, the object of the present invention, the first switching control signal $scc_1$ presents a fall time, and a rise time respectively, greater than that of the second switching control signal $scc_2$.

Moreover, the symmetric adapter unit for switching a logic signal, the object of the present invention, includes a bistable type switching module 2 receiving the first scc, and second $scc_2$ switching control signal and delivers to an output terminal constituting the output terminal of the logic signal symmetric adapter unit, the object of the invention, either the logic signal adapted in phase with the logic signal for a first logical value of the control logic signal, or for a complemented value of this first logical value of the control logic signal, the more or less constant signal to the high impedance output terminal.

In general, it is indicated that the bistable type switching module 2 is realised in CMOS technology from a CMOS p-type switching element, bearing the reference $B_1$ on FIG. 1, and a CMOS n-type switching element, bearing the reference $B_2$ on FIG. 1. It is indicated in particular that the asymmetrical structure of the first and second switching control signal $scc_1$ and $scc_2$ is adapted so as to take into account differences in switching time parameters of the two switching elements, the CMOS p-type, referenced $B_1$, and the CMOS n-type, referenced $B_2$, for the very purpose of obtaining the output of a substantially symmetric output signal DOUT, both in high logic level/low logic level switching and vice versa, as will be described later in the description.

It is understood in particular that the CMOS p-type switching element $B_1$ can be realised in terms of the characteristics of the outgoing line by a CMOS p-type transistor, with channel width adapted, whereas, as will be described hereafter in the description, the CMOS n-type switching element, $B_2$, will be realised by means of a group of CMOS n-type transistors the characteristics of which, in particular channel width, are adapted so as to obtain switching characteristics relative, both to switching impedance and to rise or fall time during switching from low logic level to high logic level, and from high logic level to low logic level respectively, more or less comparable to those of the aforementioned switching element $B_1$.

Thus, the symmetrical character of the adapter unit for switching a logic signal, the object of the present invention, results from the implementation, on the one hand, of the aforementioned asymmetric control signals $scc_1$ and $scc_2$ as well as, on the other hand, of specific switching elements $B_1$ and $B_2$.

A more detailed description of the control module 1 will now be given, still linked to the same FIG. 1.

On the aforementioned figure, the control module 1 comprises at least one NAND logic gate 10 receiving at a first logical input the original logic signal and at a second input a logic signal duplicating the control logic signal CTR, and denoted for this reason CTR*. It is understood in particular that the logic signal duplicating the control logic signal CTR can be obtained from the latter during electronic transmission circuit lag, as will be described hereafter in the specification. Thus, the output terminal of the NAND logic gate 10 delivers a first intermediate switching control signal, denoted for this reason $iscc_1$.

Moreover, as shown in FIG. 1, the transmission control module 1 also comprises a NOR logic gate, bearing the reference 11, and a first inverter 12, which receives the control logic signal CTR and delivers an inverted control logic signal, denoted for this reason $\overline{CTR}$. The NOR logic gate 11 receives in addition, at a first logical input, the original logic signal DIN, and at a second logical input, the inverted or complemented control logic signal $\overline{CTR}$, and delivers as a consequence a second intermediate switching control logic signal, denoted for this reason $iscc_2$.

Moreover, the control module 1 comprises a second inverter 13, which receives the inverted control logic signal $\overline{CTR}$, and delivers the logic signal duplicating the control logic signal CTR*. It is therefore understood that after two inversions via the inverters 12 and 13, the logic signal duplicating the control logic signal CTR* is in phase with the control logic signal CTR but subject to a time shift of a length equal to the time of transmission by the two aforementioned inverters 12 and 13.

Finally, the control module 1 comprises an asymmetric formatting module 14 receiving the first and second intermediate switching control logic signal $iscc_1$ and $iSCC_2$ to deliver the first and second switching control signal $scc_1$ and $scc_2$.

On FIG. 1, the asymmetric formatting module 14 is said to comprise capacitive type electrical elements 140, 142, 143 as well as a resistive element 141 the values of which are adapted so as to modify rise times, and fall times respectively, of intermediate switching control logic signals $iscc_1$ and $iscc_2$, the rise times, and fall times respectively, of which at the outlet of the NAND gates 10 and 11, are more or less identical or, at least, too little different to directly ensure appropriate control of the switching elements $B_1$ and $B_2$ of the switching module 2 previously mentioned in the description.

Thus, it is understood that the asymmetric formatting module 14 can include, as shown on FIG. 1, a first resistor capacitor circuit 141, 140 the values of which are chosen so as to present a first given value time constant, this first resistor capacitor circuit receiving the first intermediate switching control logic signal $iscc_1$ in order to finally deliver the first switching control signal $scc_1$.

The asymmetric formatting module 14 also includes a second resistor capacitor circuit with a second time constant, constituted by the capacitors 142 and 143 shown on FIG. 1. It is of course understood that the capacitors 142 and 143, given the input and output impedances of the switching element $B_2$, and of the NOR gate 11 respectively, thus enable a second resistor capacitor circuit to be constituted with a second time constant greater than the first time constant relative to the first resistor capacitor circuit 141, 140. Thus, the second resistor capacitor circuit receives the second intermediate switching control logic signal $iscc_2$ and delivers the second switching control signal $scc_2$, to the switching element $B_2$.

A more detailed description of a particular mode of implementation of the symmetric adapter unit for switching a logic signal, the object of the present invention, as shown in FIG. 1, in CMOS technology, will now be given linked to FIG. 2, this figure showing an electrical installation diagram of CMOS components enabling the implementation of the functional elements shown in FIG. 1.

For this reason, the same functional elements are carried over to FIG. 2 in conditions which will be made clear below.

Figure 2:
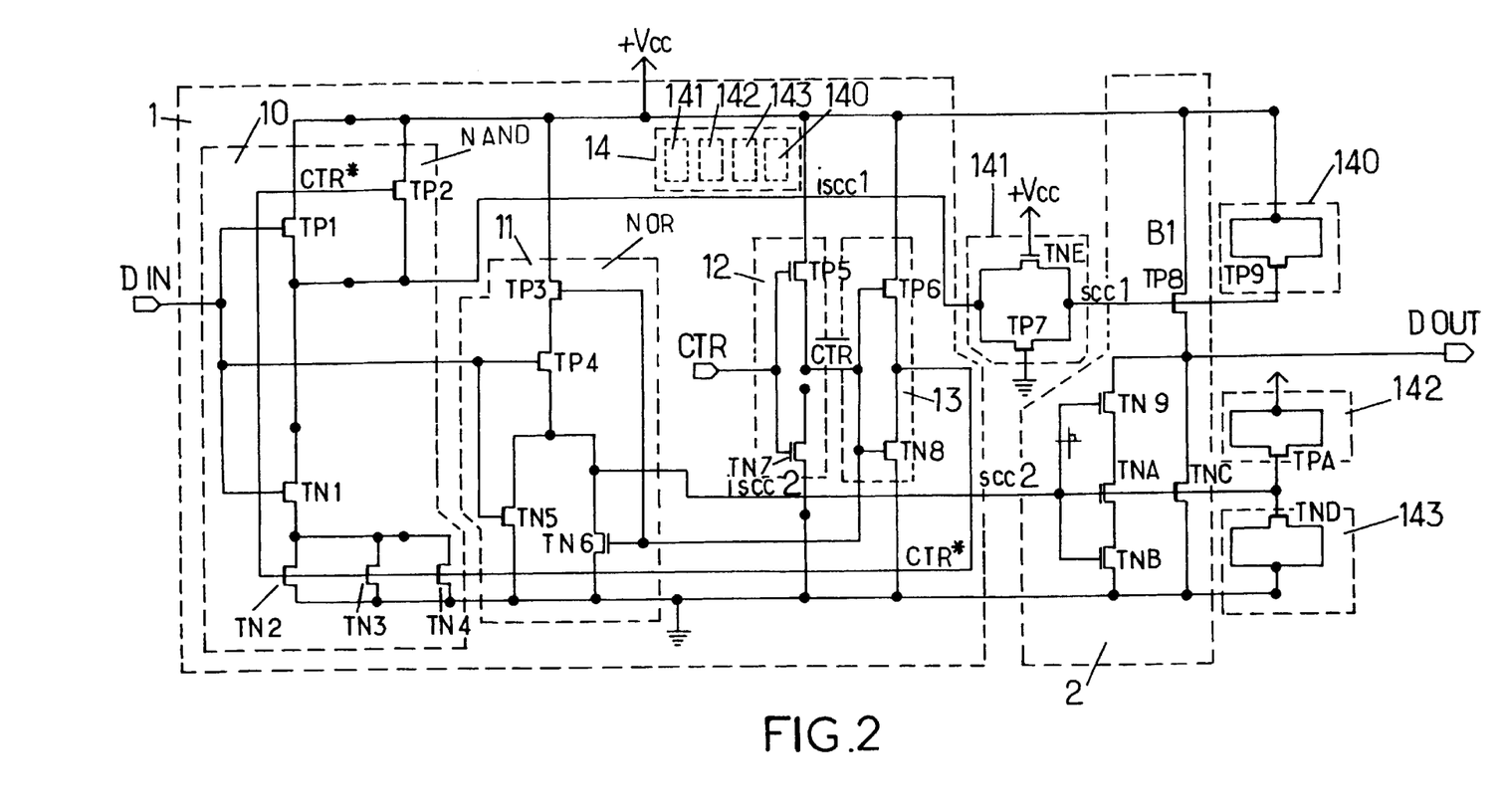
FIG. 2 shows, as a non-restrictive example, a method of application in CMOS technology of the symmetric adapter unit, the object of the present invention, shown in FIG. 1.

As regards firstly the bistable type switching module 2, this may comprise, as shown on the aforementioned FIG. 2, a P-type MOS transistor, bearing the reference TP8 and constituting in fact the switching element $B_1$ of FIG. 1. The CMOS-P transistor TP8 is connected between the supply voltage and an intermediate point constituting the output terminal delivering the signal DOUT, a logic signal adapted in phase with the original logic signal DIN, this intermediate point being of course connected to the switching element $B_2$, as shown in FIG. 1.

It is thus understood that the switching elements $B_1$ and $B_2$ constitute a bistable type switching element, the switching element $B_2$ being connected between this intermediate point or output terminal and the reference voltage or ground voltage of the symmetric adapter unit for switching a logic signal, the object of the present invention. Of course, the drain electrode of the transistor TP8 is connected to the positive DC supply voltage corresponding to the high logic level, whereas the source electrode of this same transistor TP8 is connected to the output terminal of the symmetric adapter unit for switching a logic signal, i.e. to the aforementioned intermediate point in order to deliver the DOUT signal. The gate of the transistor TP8 receives the first switching control signal $scc_1$.

As regards the switching element $B_2$ shown in FIG. 1, this, in the application shown in FIG. 2, includes an N-type MOS transistor, referenced TN9, the source electrode of which is connected to the output terminal, i.e. the aforementioned intermediate terminal of the symmetric adapter unit, the object of the present invention, and the drain electrode of which is connected to the reference voltage via a circuit of static impedance matching the previously mentioned p-type MOS transistor, TP8. It may be recalled at this point that the reference voltage or ground voltage is equal to the low logic level of the original logic signal. The gate of the n-type MOS transistor TN9 receives of course the second switching control signal $scc_2$.

As regards the circuit of static impedance matching the p-type MOS transistor TP8 or $B_1$ of the switching element $B_2$, it is indicated, as shown on FIG. 2, that this includes to advantage a first and a second n-type MOS transistor, denoted TNA, TNB, connected in series with the n-type MOS transistor, TN9 aforementioned, as well as a third n-type MOS transistor, denoted TNC, this third n-type MOS transistor, referenced TNC, being connected in parallel on the branch formed by the n-type MOS transistor, TN9, the first and the second n-type MOS transistors being connected in series with the latter, and referenced TNA and TNB. The gates of the first TNA, of the second TNB and of the third TNC n-type MOS transistors also receive the second switching control signal $scc_2$.

However, in the application on FIG. 2, it is indicated that the modes of installation of the resistive 141 and capacitive 140, 142 and 143 elements intended to constitute the asymmetric formatting module 14 previously mentioned in the description are not shown functionally to the same degree as in the case of FIG. 1, so as not to overload the drawing. Indeed, these elements being all realised equally in CMOS technology their installation point can vary according to the surface of silicon required. Therefore, as regards elements 140, 142 and 143, these can be realised, as shown on FIG. 2, via a TP9 and TPA transistor for elements 140, 142, and an NMOS transistor TND for element 143 respectively, the drain and source electrodes of which are linked in parallel with the DC supply voltage for transistors TP9 and TPA relative to elements 140 and 142, whereas the drain and source electrodes of the NMOS transistor TNB are linked in parallel with the reference voltage for element 143. The gate of transistor TP9 receives the first intermediate switching control signal iscc1 via the resistor 141, i.e. finally the first switching control signal $scc_1$ for the gate of the transistor TP8, whereas on the contrary, the gate of the transistors TPA and TND receives the second intermediate switching control signal $iscc_2$. It is thus understood that, by reason of the polarisation at the same voltage of the drain and source electrodes of the transistors TP9 and TPA, TND, the capacitance of the gate/source electrode, or input capacitance of each corresponding transistor, is thus used to realise the capacitive elements 140, 142 and 143 shown on FIG. 1.

As regards the resistive element 141, this can be realised, as shown on FIG. 2, thanks to the implementation of an NMOS transistor TNE and a PMOS transistor TP7 connected head-to-foot, a source—drain electrode, and drain—source respectively, the gate of the transistor TNE being connected to the positive DC supply voltage and the gate of the PMOS transistor TP7 being connected to the reference voltage. Thus, the two transistors TNE, TP7 act as a resistor equal to the parallel connected resistance of the drain-source channel of each of the two aforementioned transistors. The $iscc_1$ signal, the first intermediate control logic signal, is then transmitted by the resistive element 141 thus constituted so as to generate with the capacitive element 140 the first switching control logic signal $scc_1$.

In order to recall the functional character of the asymmetric formatting module 14 as shown in FIG. 1, this is recalled in dotted lines on FIG. 2 at the level of the control module 1 corresponding with its previously mentioned constituent elements 141, 142, 143 and 140, although these constituent elements are not installed at the level of the transmission or non-transmission control module 1 previously described in liaison with FIG. 1.

As regards the NAND type logic gate 10, this can of course be realised in CMOS technology, as shown in FIG. 2. In this case, it is indicated that this logic gate can include a PMOS transistor, denoted TP1, connected in cascade with an NMOS transistor TN1, itself connected in cascade with three NMOS transistors connected in parallel, TN2, TN3 and TN4. The group of transistors TN2, TN3 and TN4 is therefore connected in series with the NMOS transistor TN1 and the PMOS transistor, denoted TP1, between the DC supply voltage and the reference voltage of the symmetric adapter unit for switching a logic signal, which is the object of the invention. The gate of the transistors TP1 and TN1 receives the original logic signal DIN. Moreover, to the PMOS transistor TP1 is connected in parallel a transistor TP2. The point common to the drain electrodes of the transistors TP1 and TP2 and the source electrode of the transistor TN1 constitutes the output terminal of the NAND gate 10 and delivers in consequence the first intermediate switching control signal $iscc_1$. The gates of transistors TP2 and transistors TN2, TN3 and TN4 receive the logic signal duplicating the control logic signal CTR*.

As regards the NOR gate 11, this includes, as shown on FIG. 2, a PMOS transistor TP3 the drain electrode of which is connected to the positive DC supply voltage, this transistor TP3 being connected with another PMOS transistor TP4 in series, the assembly constituted by transistors TP3, TP4 being itself connected in series with two NMOS transistors in parallel, TN5 and TN6. The source electrodes of transistors TN5 and TN6 are connected to the source electrode of PMOS transistor TP4 and the drain electrodes of transistors TN5 and TN6 are connected to the reference voltage. The gates of transistors TP4 and TN5 receive the original logic signal DIN. The gates of PMOS transistor TP3 and of NMOS transistor TN6 are interconnected to each other. The common point between the electrodes of transistors TP4, TN5 and TN6 constitute the output terminal of the NOR gate 11, which delivers the second intermediate switching control signal iscc$_2$.

Finally, the first inverter 12 is usually constituted, as shown in FIG. 2, by a PMOS transistor TP5 and an NMOS transistor TN7, which are controlled so as to constitute a bistable type element between the positive DC supply voltage and the reference voltage, the gates of the transistors TP5 and TN7 receiving the aforementioned control signal CTR, the common point of the electrodes of transistors TP5 and TN7 delivering the inverted control signal $\overline{CTR}$.

In the same way, the second inverter 13 is constituted by a PMOS transistor TP6 and an NMOS transistor TN8 connected in cascade so as to realise a bistable type unit between the DC supply voltage and the reference voltage. The gates of the transistors TP6 and TN8 receive the inverted control signal $\overline{CTR}$ and the common point of the electrodes of transistors TP6 and TN8 deliver the logic signal duplicating the control signal, denoted CTR*. The inverted control signal $\overline{CTR}$ is moreover delivered by an interconnection to the gate of transistors TN6 and TP3 from the NOR logic gate 11.

Different signals recorded at noteworthy test points of the symmetric adapter unit for switching a logic signal, the object of the present invention, will now be described in liaison with FIGS. 3a, 3b and subsequent figures.

Figure 3A:
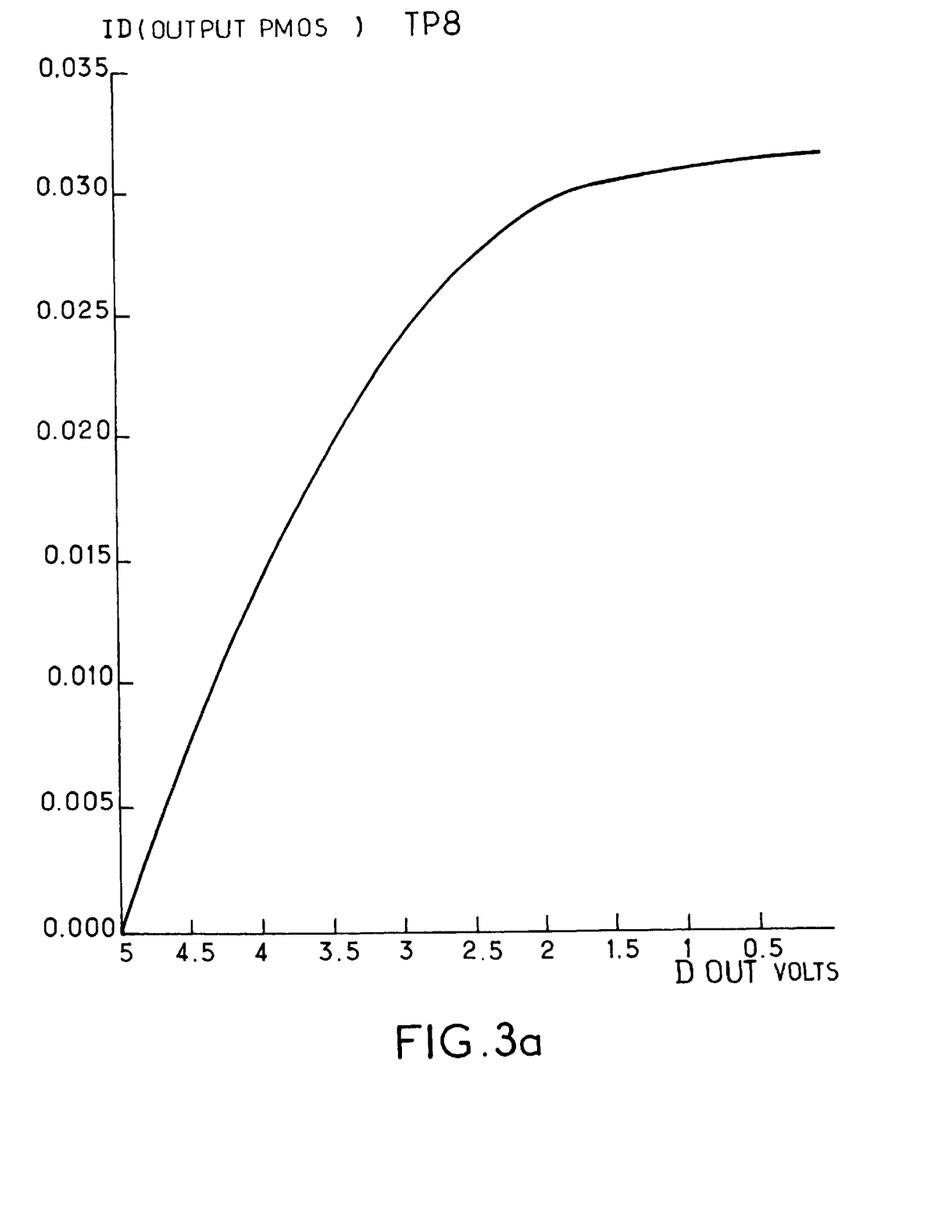
FIGS. 3a and 3b show a timing diagram of the currents consumed by the bistable type switching module realised in CMOS technology, during switching.
Figure 3B:
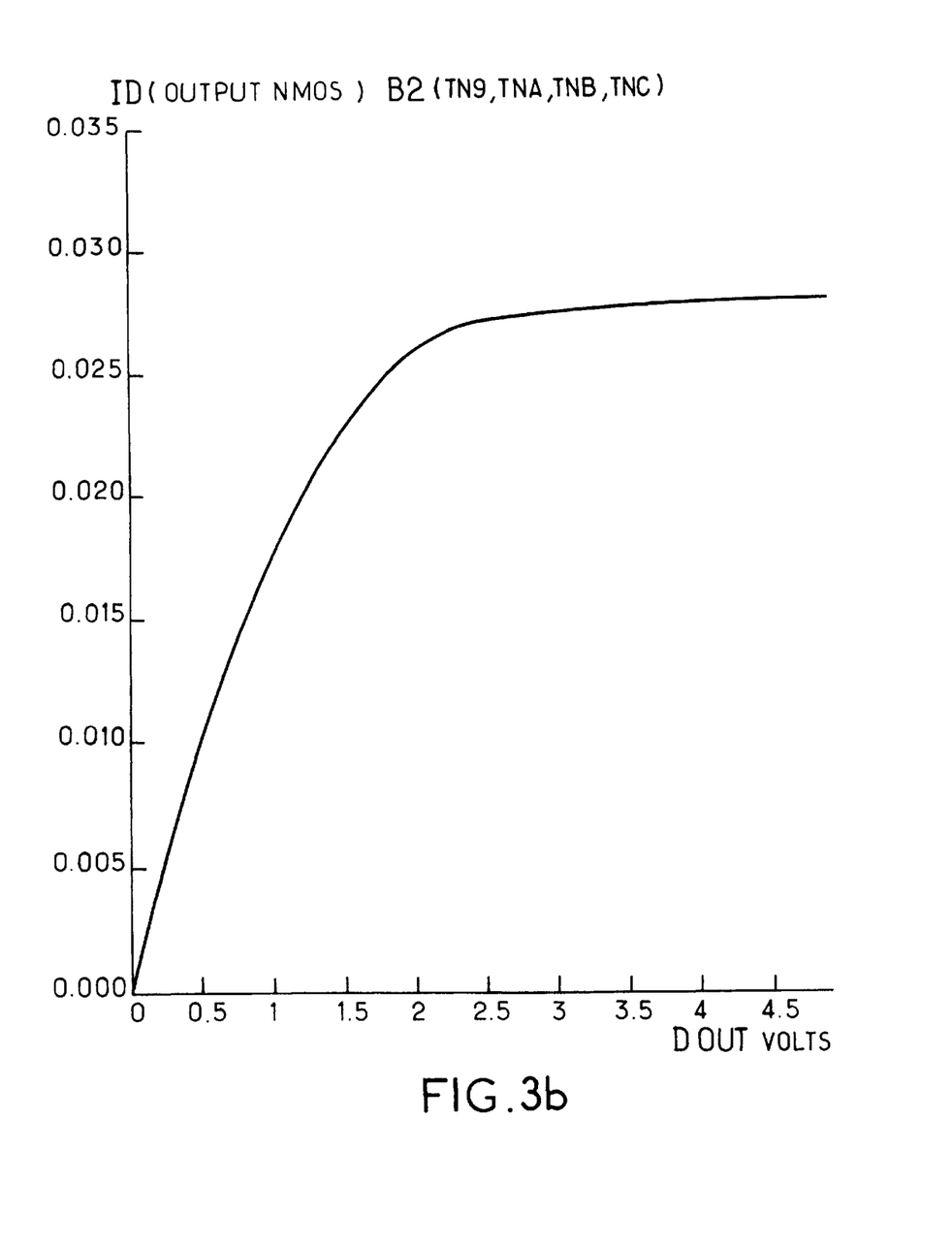

On FIGS. 3a and 3b, has been shown the current gain of the switching element B$_1$, i.e. in fact of the PMOS transistor TP8 of FIG. 2, for switching from 5 volts to 0 volts, i.e. from high logic level to low logic level, whereas on figure 3b has been shown the current gain of the switching element B$_2$ in the same switching conditions. The gate voltage applied to the switching element B$_1$ was 0 volts for an ambient temperature of 25° C. On the other hand, the gate voltage applied to the switching element B$_2$ was 5 volts for an ambient temperature of 25°. The DC supply voltage was the normal 5 volts.

As regards FIG. 3b, it is indicated that the value of the current passing through the switching element B$_2$ is in fact the value of the current passing through the transistors TN9, TNA, TNB and TNC shown in FIG. 2.

It can be seen that the current gain, both in the switching element B1 and in the switching element B2, is more or less identical. The maximum current variation between the two transitions is about 5 mA from the maximum value of the current, i.e. 33 mA.

Figure 4A:
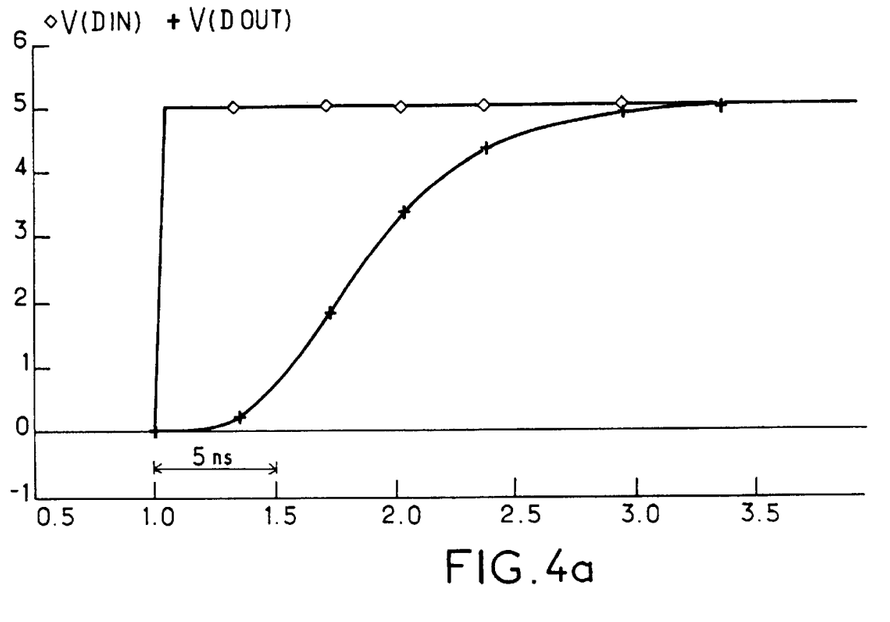
FIGS. 4a and 4b show a timing diagram of the low logic level/high logic level switching of the logic signal and of the adapted logic signal transmitted by the symmetric adapter unit, and of the first and second corresponding asymmetric switching control signal respectively.

On FIG. 4a, has been shown on the other hand, for a transition of a logic signal at a low logic level to a high logic level passing from 0 volts to 5 volts in a switching time not exceeding 0.5 ns, the evolution of the output signal DOUT constituting in fact the signal adapted in phase with the original logic signal. The total lag in rise time of the output signal DOUT compared with the original logic signal DIN does not exceed 20 ns.

Figure 4B:
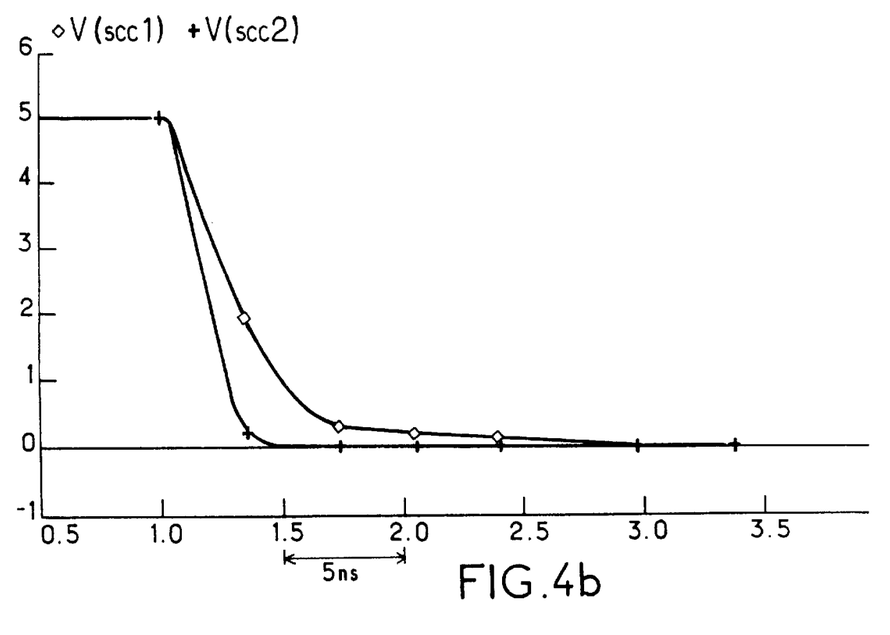

On FIG. 4b on the other hand, has been shown the evolution of the first scc$_1$ and of the second scc$_2$ switching control signal. The first switching control signal scc$_1$ presents a fall time greater than the fall time of the second switching control signal scc$_2$, by about 3 ns.

Figure 5A:
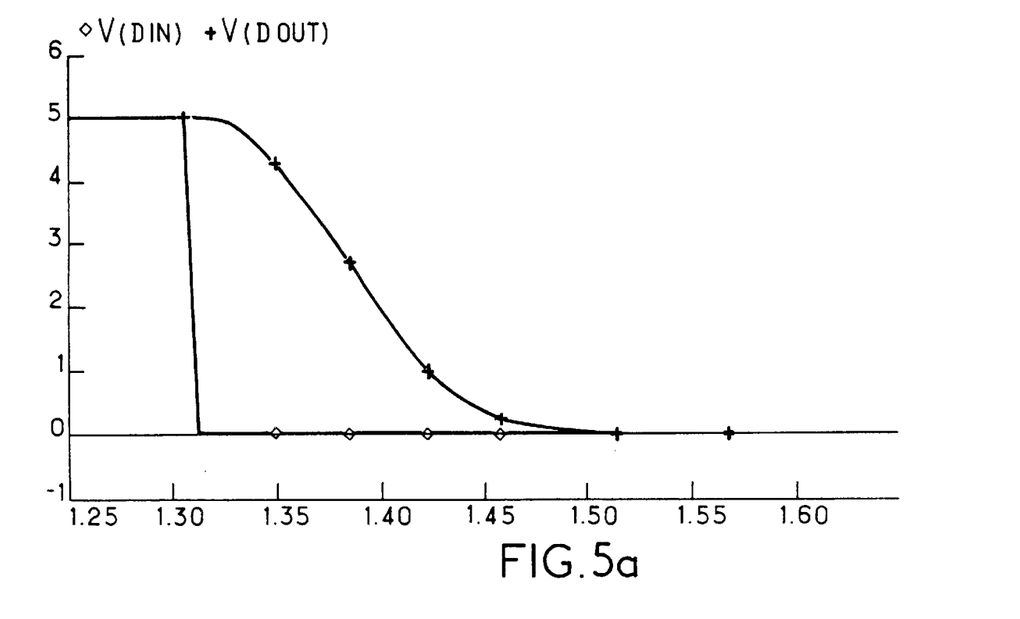
FIGS. 5a and 5b show a timing diagram of the high logic level/low logic level switching of the adapted logic signal transmitted by the symmetric adapter unit, and of the first and corresponding second asymmetric switching control signals respectively.
Figure 5B:
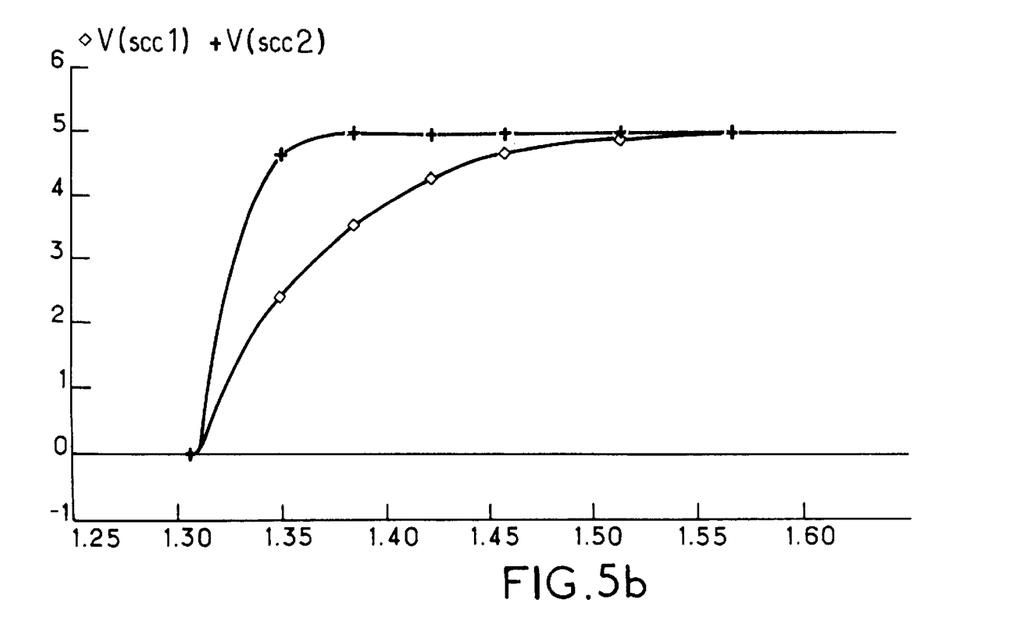

In the same way, in FIGS. 5a and 5b have been shown the same signals as in FIGS. 4a and 4b respectively, in the case of switching an original logic signal from the 5 volts DC high logic level to the low logic level, reference or ground voltage.

FIG. 5a shows the evolution of the output voltage DOUT, which, compared with the input voltage DIN, presents a similar lag not exceeding 20 ns compared with the case of symmetric switching shown in FIG. 4a. It is possible in particular, by superimposing FIG. 5a over FIG. 4a, to see that the rate of rise times, and fall times respectively, is more or less the same with a symmetrical evolution of gradient.

FIG. 5b shows the evolution of the first switching control signal scc$_1$ and of the second switching control signal scc$_2$. The lag in rise time of the first switching control signal scc$_1$ compared with the second switching control signal scc$_2$ is again about 3 ns.

Superimposing FIGS. 4a and 5a shows that the static and dynamic impedances of switching elements B$_1$ and B$_2$ in accordance with FIG. 1 or FIG. 2 are thus adapted to the same value more or less.

Other tests have been carried out, these tests being expressed in the form of comparative tests in FIGS. 6a, 6b and 7a, 7b below.

Figure 6A:
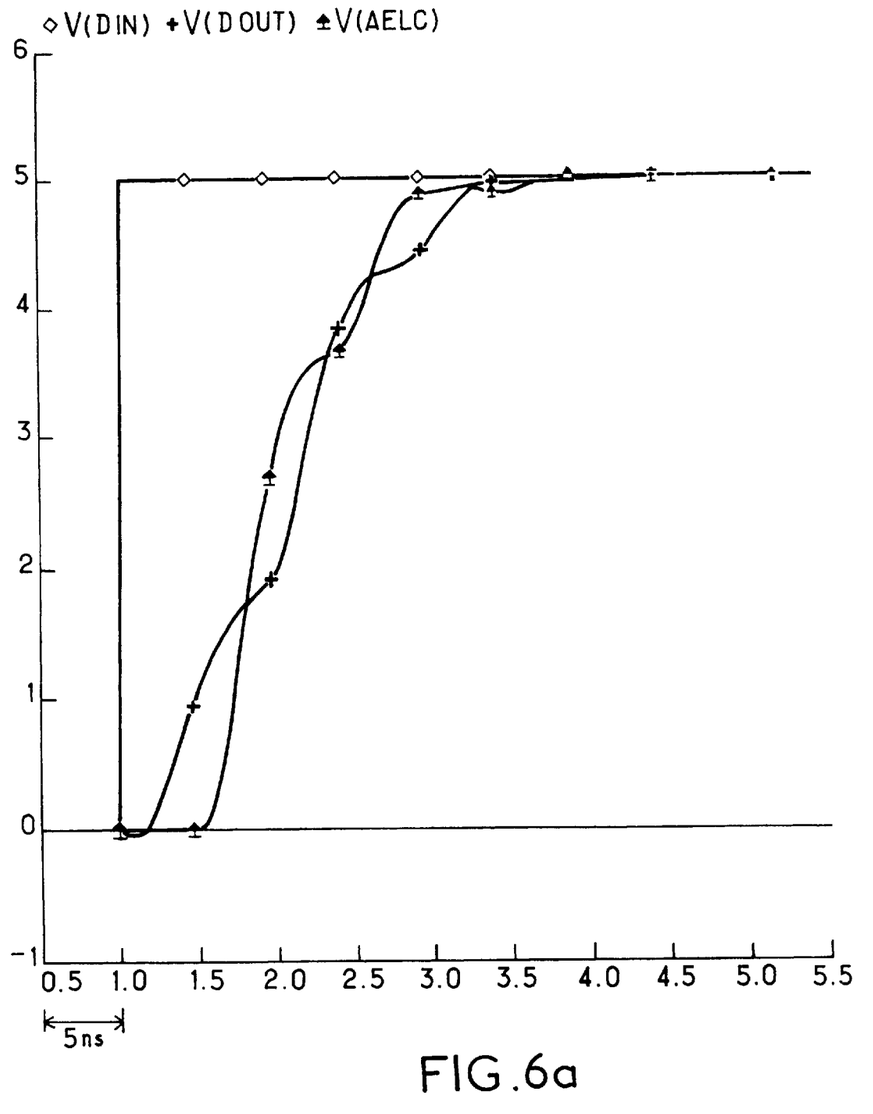
FIGS. 6a and 6b show a timing diagram of the low logic level/high logic level switching, and high/low respectively, of a logic signal by means of a symmetric adapter unit equipped with a transmission line specific to the adapter unit output/transmission line and end of transmission line junction.
Figure 6B:
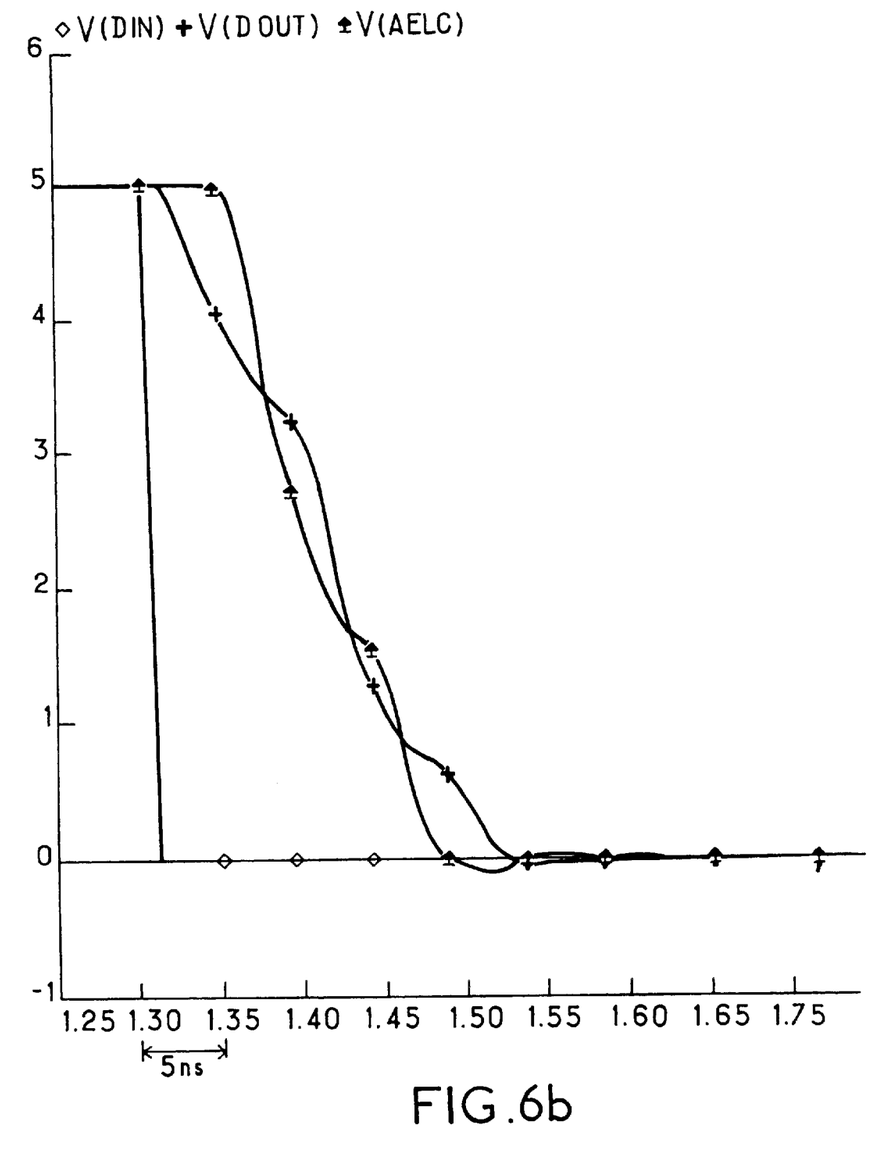

On FIGS. 6a, 6b have been shown, on the one hand, the evolution of a low logic level/high logic level transition of the input logic signal DIN, of the logic signal adapted to the output signal DOUT and finally, of a signal corresponding to this output signal transmitted at the end of a loaded transmission line a few centimetres long, this transmission line presenting a characteristic impedance of 50 Ω.

It can be seen, at the outset, on FIG. 6a, that the representative voltage of the adapted logic signal, or output signal DOUT, is modified in relation to the corresponding output signal shown on FIG. 4a when the symmetric adapter unit for switching a logic signal, the object of the present invention, runs idle, i.e. in the absence of any link to a transmission line. It can be seen particularly on FIG. 6a that the transition from low logic level to high logic level, i.e. the transition of the adapted logic signal constituting the output signal, presents slight rise time disturbance. This disturbance is indeed slight, since the transition remains monotone low to high from the low logic level to the high logic level, in the absence of any negative derived voltage bounce. The same is true as regards the signal transmitted at the end of the loaded line, this signal representing more or less a monotone transition low to high from the low logic level to the high logic level.

On FIG. 6b, has been shown, on the other hand, the case of a high logic level/low logic level transition in the same experimental conditions as in the case of FIG. 6a, i.e. for a symmetric adapter unit for switching a logic signal linked to a loaded transmission line. It can likewise be seen that, in that case, the transitions representative of the output signal DOUT and of the signal obtained at is the end of the loaded line, i.e. at the level of the load, constitute a monotone transition high to low in the near-absence of voltage bounces.

Figure 7A:
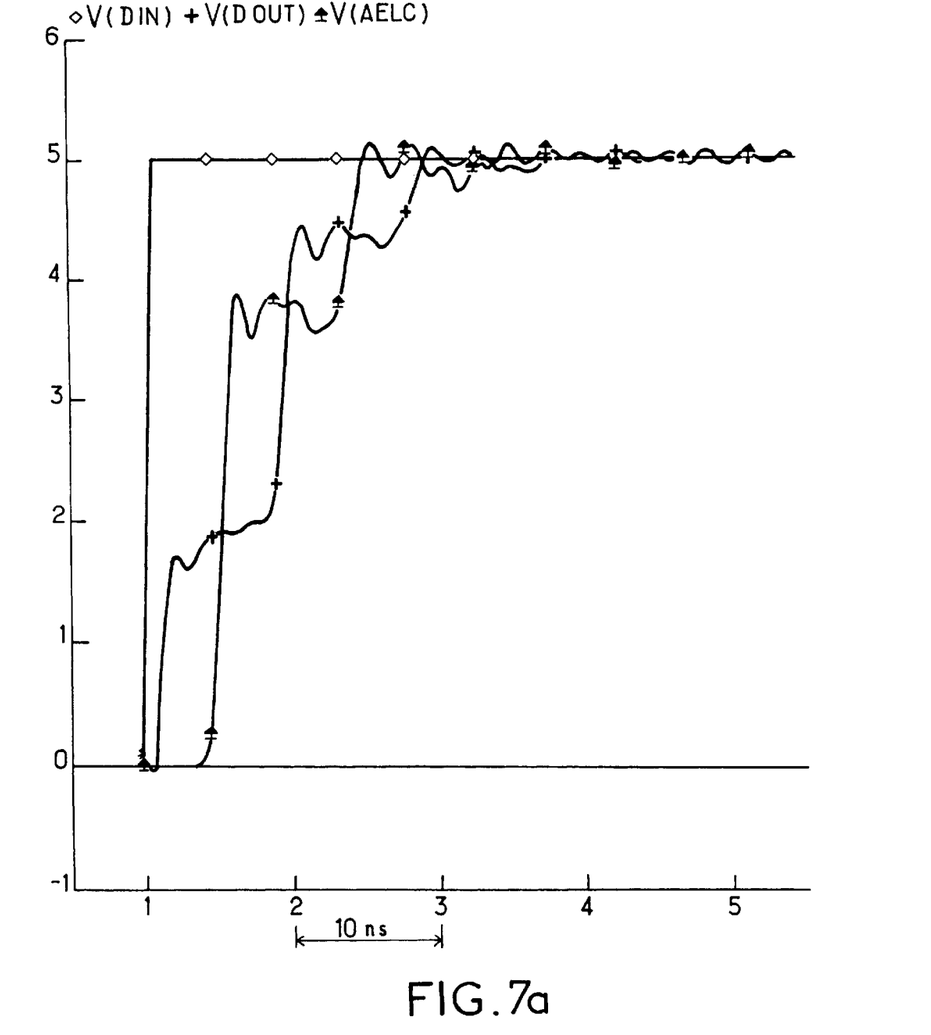
FIGS. 7a and 7b show a timing diagram of low logic level/high logic level switching, and high/low respectively, of a logic signal transmitted on a transmission line identical to the line used in the case of FIGS. 6a and 6b, in the absence of a symmetric adapter unit in keeping with the object of the invention, at line-in and line end.
Figure 7B:
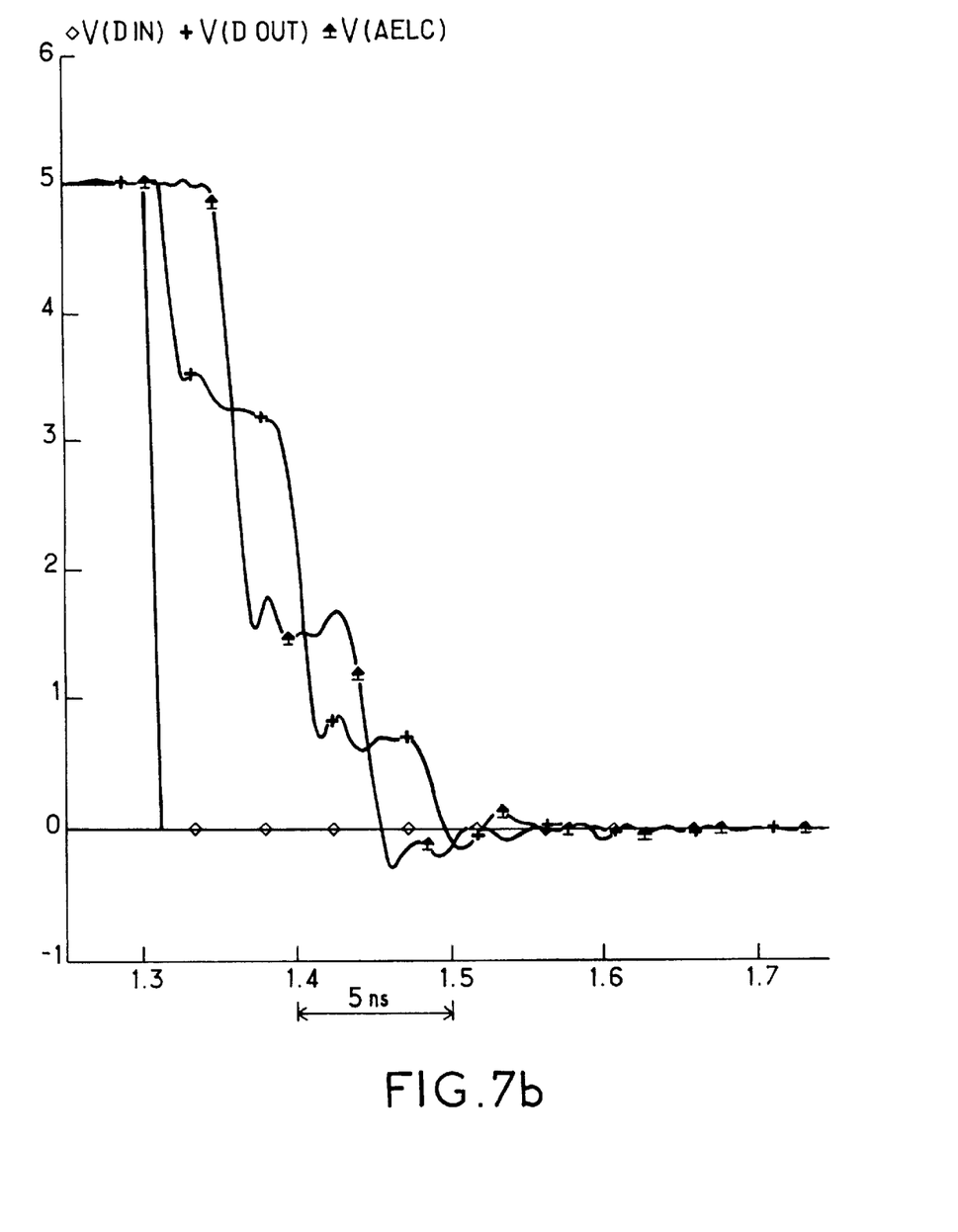

FIGS. 7a and 7b show the timing diagrams for signals obtained for a low logic level/high logic level transition, and a high logic level/low logic level transition respectively, in the case where the original logic signal is delivered to a same transmission line as in the case of FIGS. 6a and 6b yet in the absence of a symmetric adapter unit for switching a logic signal, in accordance with the object of the present invention.

Both in the case of FIG. 7a and in that of FIG. 7b, the existence may be noted of numerous voltage bounces which are expressed by a disturbed transition in which the transition is not monotone, either in rise or in fall.

Thus has been described a symmetric adapter unit for switching a logic signal which enables numerical data to be sent in a transmission line, this unit particularly enabling rates of reflection to be smoothed out, in other words for any bounce in the logic level switching transitions to be eliminated, these transitions being then more or less monotone, either low to high, or high to low.

The adapter unit, which is the object of the present invention, thus enables as far as possible a reduction in the noise conducted despite variations in output voltage between the high logic level and the low logic level, and vice versa.

As regards high impedance output operation, it is indicated that this is obtained thanks to transistors TP5, TP6, TN7 and TN8, which enable the high impedance setting of the output to be ensured when the control signal CTR is at zero value. It is understood that, in this case, the inverters 12 and 13 then enable switching elements $B_1$ and $B_2$ to be blocked. In the opposite case, for CTR at the high logic level, the output terminal delivers the adapted logic signal DOUT, which lags in relation to the input signal DIN in the conditions previously described in the description.

The symmetric adapter unit for switching a logic signal, which is the object of the present invention, is particularly advantageous in so far as it enables integration into a logic type array, while a quasi-symmetrical evolution of electrical parameters is thus obtained. Moreover, this unit enables an absence of static consumption to be obtained and, in the case of a dynamic operation, switching transitions to be formatted with an appreciable reduction of reflection levels with the elimination of voltage bounces.

What is claimed is:

1. A symmetric adapter unit for switching a logic signal, the switching of this logic signal occurring between a high logic level and a low logic level, or vice versa, said adapter unit delivering a logic signal adapted in phase with said logic signal, and a substantially constant signal respectively to a high impedance output terminal, said adapter unit comprising at least, connected in cascade, means of control of transmission or non-transmission by said adapter unit, said means of control receiving at a first input terminal said logic signal and at a second input terminal a control logic signal, and delivering a first and a second asymmetric switching control signal, said first switching control signal from the high logic level to the low logic level, or vice versa, presenting a fall time, and a rise time respectively, greater than that of said second switching control signal, and switching means of bistable type receiving said first and second switching control signals and delivering to an output terminal, constituting an output terminal of said symmetric adapter unit, said logic signal adapted in phase with said logic signal for a first logic value of said control logic signal, and, for a complemented value of this first logic value of said control logic signal, and said substantially constant signal to said high impedance output terminal, wherein said adapter unit being implemented in CMOS technology, said switching means of bistable type comprise at least:

a p-type MOS transistor the drain electrode of which is connected to a positive supply voltage, corresponding to said high logic level, and the source electrode of which is connected to said output terminal of said adapter unit, the gate of the said p-type MOS transistor receiving said first switching control signal;

an n-type MOS transistor the source electrode of which is connected to said output terminal of said adapter unit and the drain electrode of which is connected to a reference voltage, ground voltage, corresponding to said low logic level, via a circuit of static impedance matching said p-type MOS transistor, the gate of said n-type MOS transistor receiving said second switching control signal, said circuit of static impedance matching said p-type MOS transistor including a first and a second n-type MOS transistor, connected in series with said n-type MOS transistor, and a third n-type MOS transistor connected in parallel on the limb formed by the n-type MOS transistor, the first and second n-type MOS transistors connected in series, the gates of the first, of the second and of the third n-type MOS transistors receiving said second switching control signal.

2. A symmetric adapter unit in accordance with claim 1, wherein said means of control comprise at least:

a NAND logic gate receiving at a first logic input said logic signal and at a second input a logic signal duplicating said control logic signal, the output terminal of said NAND logic gate delivering a first intermediate switching control logic signal, a NOR logic gate and a first inverter, said first inverter receiving said control logic signal and delivering an inverted control logic signal, said NOR logic gate receiving at a first logic input said logic signal and at a second logic input said inverted control logic signal and delivering a second intermediate switching control logic signal;

a second inverter receiving said inverted logic control signal and delivering said logic signal duplicating said control logic signal;

means of asymmetric formatting receiving said first and second intermediate switching control logic signals and delivering said first and second switching control signals.

3. A symmetric adapter unit in accordance with claim 2, wherein said means of asymmetric formatting include:

a first resistor capacitor circuit with a first time constant receiving said first intermediate switching control logic signal and delivering said first switching control signal;

a second resistor capacitor circuit with a second time constant, greater than said first time constant, receiving said second intermediate switching control logic signal and delivering said second switching control signal.

* * * * *